(12) United States Patent
Elmiger et al.

(10) Patent No.: US 12,461,156 B2
(45) Date of Patent: Nov. 4, 2025

(54) DETECTING WELDED RELAY CONTACTS USING SPANNER VOLTAGE MEASUREMENT

(71) Applicant: Rockwell Automation Technologies, Inc., Mayfield Heights, OH (US)

(72) Inventors: David Elmiger, Hitzkirch (CH); Kyle B. Adkins, Oak Creek, WI (US); Andrew E. Carlson, Franklin, WI (US); David M. Messersmith, Kenosha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 218 days.

(21) Appl. No.: 18/338,960

(22) Filed: Jun. 21, 2023

(65) Prior Publication Data

US 2024/0426915 A1    Dec. 26, 2024

(51) Int. Cl.
*G01R 31/327* (2006.01)
*H01H 47/00* (2006.01)
*H01H 47/02* (2006.01)

(52) U.S. Cl.
CPC ....... *G01R 31/3278* (2013.01); *H01H 47/002* (2013.01); *H01H 2047/003* (2013.01)

(58) Field of Classification Search
CPC ........... H01H 47/002; H01H 2047/003; H01H 47/005
See application file for complete search history.

(56) References Cited

U.S. PATENT DOCUMENTS

| | | | |
|---|---|---|---|
| 4,914,315 A | 4/1990 | Nickolai | |
| 8,901,934 B2 | 12/2014 | Namou et al. | |
| 2008/0089000 A1 | 4/2008 | Drake | |
| 2009/0228163 A1* | 9/2009 | Tarchinski | B60L 3/0053 903/907 |
| 2015/0054517 A1* | 2/2015 | Yonezaki | B60L 3/0046 324/418 |
| 2015/0137819 A1 | 5/2015 | Giordano | |

(Continued)

FOREIGN PATENT DOCUMENTS

| | | |
|---|---|---|
| CN | 112041694 A | 12/2020 |
| CN | 110140056 B | 4/2021 |

(Continued)

OTHER PUBLICATIONS

Elmiger, et al; U.S. Appl. No. 17/660,711, filed Apr. 26, 2022.

*Primary Examiner* — Huy Q Phan
*Assistant Examiner* — Temilade S Rhodes-Vivour

(57) ABSTRACT

A system includes a relay system and a controller. The relay system includes a plurality of relays, each having a first contact on an input side of the respective relay, the input side coupled to a power source, a second contact on a load side of the respective relay coupled to a load, and a spanner configured to close the first and second contacts of the respective relay when activated by a close signal. The load sides of each of the respective relays are coupled through their respective loads. The controller is configured to measure a voltage between a spanner of a first relay and an input side of a second relay. Based on the voltage between the spanner of the first relay and the input side of the second relay, the controller determines whether an electrical weld of one of the contacts of the first relay exists.

20 Claims, 6 Drawing Sheets

(56) References Cited

U.S. PATENT DOCUMENTS

| | | | |
|---|---|---|---|
| 2015/0346282 A1 | 12/2015 | Jeon | |
| 2016/0009189 A1* | 1/2016 | Yoshizawa | B60L 3/00 |
| | | | 307/9.1 |
| 2017/0317628 A1* | 11/2017 | Renner | B23K 9/1006 |
| 2017/0368951 A1* | 12/2017 | Adlhoch | B60L 53/55 |
| 2018/0158633 A1 | 6/2018 | Brandt | |
| 2018/0315565 A1 | 11/2018 | Zhang | |
| 2023/0101428 A1 | 3/2023 | Adkins et al. | |
| 2023/0131949 A1* | 4/2023 | Kataoka | H02P 29/024 |
| | | | 318/375 |
| 2023/0213582 A1 | 7/2023 | Buescher | |
| 2023/0343533 A1 | 10/2023 | Elmiger et al. | |

FOREIGN PATENT DOCUMENTS

| | | |
|---|---|---|
| DE | 10160106 A1 | 6/2002 |
| DE | 102006054294 B4 | 4/2009 |
| JP | H09289792 A | 11/1997 |
| JP | 5370553 B1 | 9/2013 |
| KR | 20140061637 A | 5/2014 |

\* cited by examiner

DETECTING WELDED RELAY CONTACTS USING SPANNER VOLTAGE MEASUREMENT

RELATED APPLICATIONS

This application is related to co-pending U.S. Applications, entitled "DETECTING WELDED RELAY CONTACTS USING ELECTRICAL PULSE," Ser. No. 18/338,870, filed concurrently, which is hereby incorporated by reference in its entirety for all purposes.

This application is related to co-pending U.S. Applications, entitled "DETECTING WELDED RELAY CONTACTS USING MEASUREMENT AFTER CURRENT BREAK," Ser. No. 18/338,912, filed concurrently, which is hereby incorporated by reference in its entirety for all purposes.

This application is related to co-pending U.S. Applications, entitled "DETECTING WELDED RELAY CONTACTS USING CONTACT CLOSE TIME MEASUREMENT," Ser. No. 18/338,940, filed concurrently, which is hereby incorporated by reference in its entirety for all purposes.

TECHNICAL BACKGROUND

In modern industrial environments relay systems are commonly used to control the supply of power to industrial equipment such as motors and the like. These relay systems commonly include a plurality of individual relays. For example, a relay system to control three-phase electrical power supplied to a piece of equipment typically includes one or more relay for each phase of the electrical power.

Over repeated operation of relay systems, materials within the contacts of the individual relays may segregate, resulting in increased concentrations of particular metal elements within small regions of the contacts. Eventually this segregation may result in metal migration such that a relay contact is welded shut.

In double break contact relays, where each relay includes two contacts, it is straightforward to determine when both contacts of the relay are shorted. However, in situations where only one of the contacts within the relay is welded detection of the weld is much more difficult.

SUMMARY

In an implementation, a system includes a relay system and a controller. The relay system includes a plurality of relays each having a first contact on an input side of the respective relay, the input side coupled to a power source, a second contact on a load side of the respective relay is coupled to a load, and a spanner configured to close the first and second contacts of the respective relay when activated by a close signal. The load sides of each of the respective relays are coupled through their respective loads.

The controller includes one or more processors and a memory. The memory having stored thereon instructions that, upon execution by the one or more processors, cause the one or more processors to perform a weld detection check.

The weld detection check includes measuring a voltage between a spanner of a first relay and an input side of a second relay, and based on the voltage between the spanner of the first relay and the input side of the second relay, determining whether an electrical weld of one of the first contact and the second contact of the first relay exists.

In another implementation, a method for detecting a welded relay contact by performing a weld detection check, includes measuring a voltage between a spanner of a first relay of a plurality of relays and an input side of a second relay of the plurality of relays. Each relay of the plurality of relays includes a first contact on an input side of the respective relay coupled to a power source, a second contact on a load side of the respective relay coupled to a load, and a spanner configured to close the first and second contacts of the respective relay when activated by a close signal. The load sides of each of the respective relays are coupled through their respective loads.

The method also includes based on the voltage between the spanner of the first relay and the input side of the second relay, determining whether an electrical weld of one of the first contact and the second contact of the first relay exists.

BRIEF DESCRIPTION OF THE DRAWINGS

Many aspects of the disclosure may be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates an example relay system including a single weld.

FIG. 4 illustrates the example relay system of FIG. 3 with power sources applied at least to inputs L1 and L2.

FIG. 5 illustrates the example relay system of FIG. 4 as a close signal is applied to the second relay.

FIG. 6 illustrates the example relay system of FIG. 5 as the second relay is closed.

DETAILED DESCRIPTION

The following descriptions of various example embodiments and implementations of a system and method for the detection of welded relay contacts using electrical pulses. As discussed above, relay systems are commonly used in the control of industrial machines. In some example embodiments, relay systems are used within motor starter controllers. These devices are used to start industrial electrical motors powered by a multi-phase power source. Typically, these power sources have three phases of alternating current (AC) power with each phase offset from the others by 120° and require relay systems having three or more relays.

When a relay is shorted within such a controller, a reversing device will suffer a line-to-line short circuit of two phases of the power source internally if a relay on the reversing phases welds. This results in a catastrophic failure and the controller may be damaged or destroyed by the event. While this example embodiment, describes a motor starter controller, many other similar controllers and their associated industrial machines suffer similar failures if a weld is undetected and the relay shorts.

In this example embodiment, single welded double break relay contacts are detected by measuring a voltage between the spanner of a first relay and the input side of a second relay. When the second relay is open, if a voltage is detected between the spanner of a first relay and the input side of a second relay there is a short or weld on the first (input side) contact of the first relay.

When the second relay is closed, if a voltage is detected between the spanner of a first relay and the input side of a second relay there is a short or weld on the second (load side) contact of the first relay This solution for detecting single welded relays provides a technical advantage by detecting these failures before they cause short circuits within the controller. This early detection allows a user to replace the controller before a potentially destructive failure of the controller.

Figure 1:
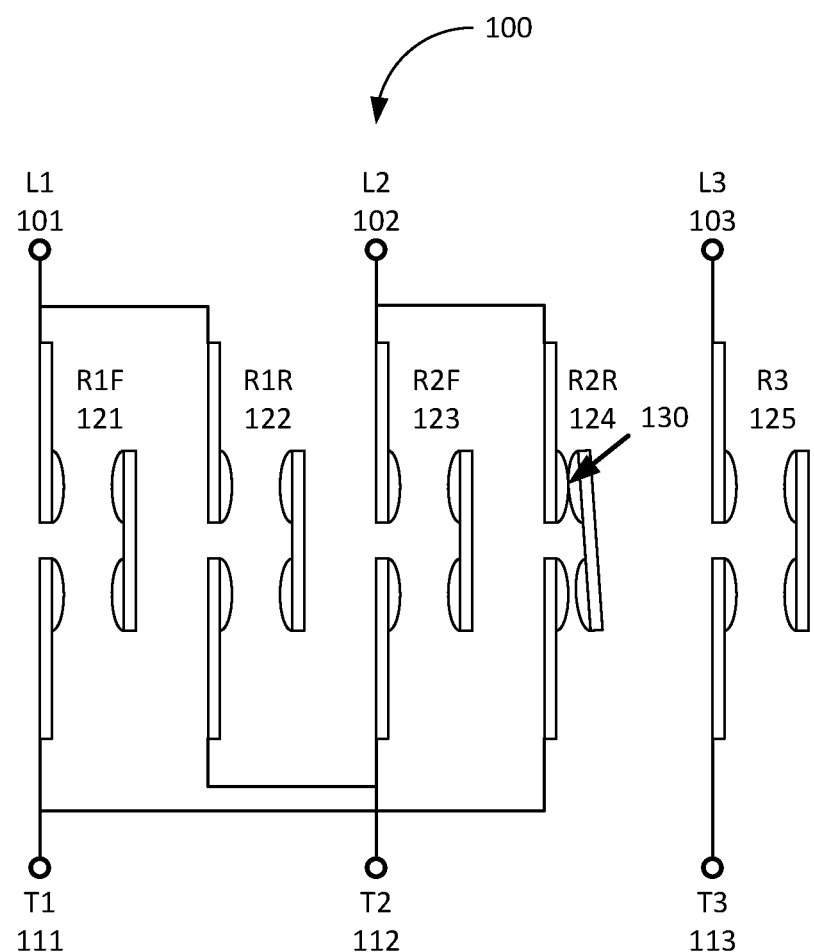
FIG. 1 illustrates an example relay system including a single weld.

FIG. 1 illustrates an example relay system 100 including a single weld 130. In this example embodiment, relay system 100 includes five relays: R1F 121, R1R 122, R2F 123, R2R 124, and R3 125. Relay system 100 includes three inputs: L1 101, L2 102, and L3 103, along with three outputs: T1 111, T2 112, and T3 113. When used in a motor starter controller, inputs L1 101, L2 102, and L3 103 are each coupled to a phase of a three-phase power source, and outputs T1 111, T2 112, and T3 113 are each coupled to a phase of an electric motor.

In this example, all of the relays: R1F 121, R1R 122, R2F 123, R2R 124, and R3 125 are off. However, relay R2R 124 has a first contact 130 which is welded shut.

Figure 2:
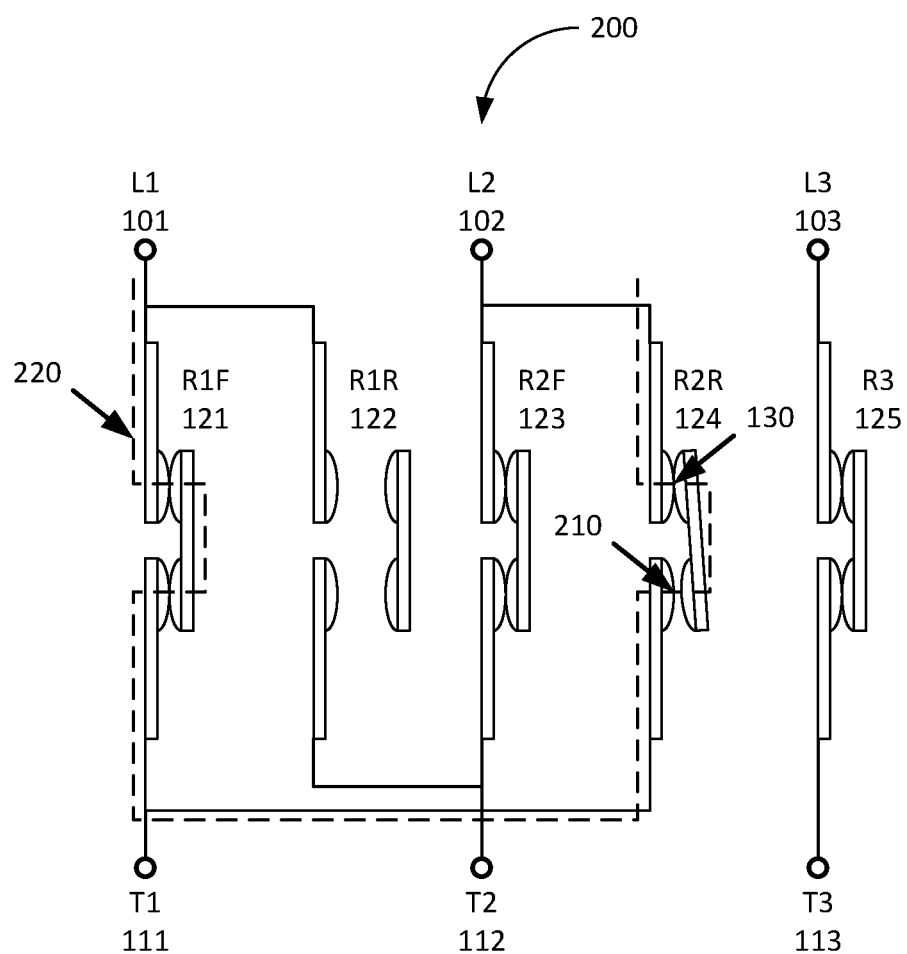
FIG. 2 illustrates the example relay system of FIG. 1 during operation where the single weld causes a short circuit.

FIG. 2 illustrates the example relay system 200 of FIG. 1 during operation where the single weld causes a short circuit. In this example embodiment, relays R1F 121, R2F 123, and R3 125 are all closed in order to drive the electric motor in a forward direction. Here, a first relay (R1F 121) is illustrated with a first contact 212 on an input side (L1 101) of the first relay, and a second contact 214 on a load side (T1 111) of the first relay.

A second relay (R2R 124) is also illustrated with a first contact 130 on an input side (L2 102) of the second relay, and a second contact 210 on a load side (T2 112) of the second relay. In this example, the first contact 130 of the second relay R2R 124 is welded.

Since the first contact 130 of the second relay R2R 124 is welded, the second contact 210 of the second relay R2R 124 has a much smaller than normal gap, and when voltage is applied, an arc may form across that gap and short the second relay R2R 124. This causes a short circuit between two phases of the input power source L1 101 and L2 102 as current flows through path 220. This short circuit may result in substantial damage to the power source and other equipment connected to relay system 200.

FIGS. 3-6 illustrate an example relay system during a series of steps performed during a method for detecting a welded relay contact by performing a weld detection check.

Figure 3:
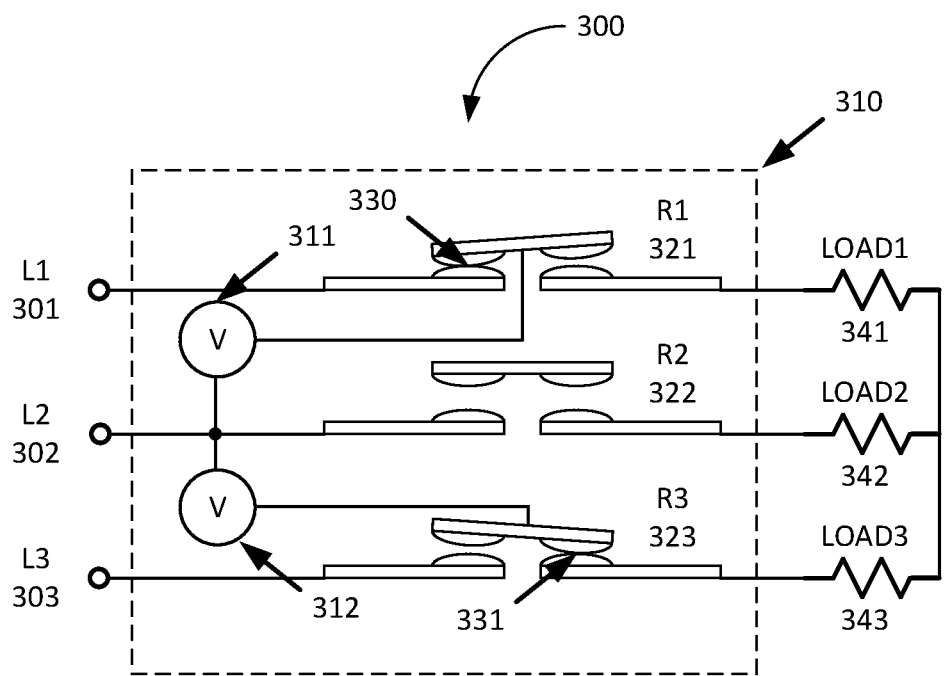
FIGS. 3-6 illustrate an example relay system during a series of steps performed during a method for detecting a welded relay contact by performing a weld detection check.

FIG. 3 illustrates an example relay system 310 including a single weld 330. In this example embodiment, a simple relay system 310 within industrial automation environment 300 is illustrated with three relays: R1 321, R2 322, and R3 323. In actual practice relay system 310 typically includes more relays, and the method illustrated in FIGS. 3-6 is performed sequentially on some or all of the relays within relay system 310.

In this example, relay system 310 includes two voltage sensors 311 and 312. These voltage sensors utilize any of a wide variety of configurations and implementations while serving to detect welds. Voltage sensor 311 is coupled with the spanner of the first relay R1 321 and the input side of the second relay R2 322. Voltage sensor 312 is coupled with the spanner of the third relay R3 323 and the input side of the second relay R3 323. In some embodiments, each spanner includes a coil and the voltage sensors 311 and 312 are attached to the coils. Each spanner is configured to close its respective relay contacts when activated by a close signal.

Here, relay system 310 includes three inputs L1 301, L2 302, and L3 303 coupled to three phases of a power source. The load sides of the relays within relay system 310 are connected to loads: LOAD1 341, LOAD2 342, and LOAD3 343 representing the loads within an industrial machine (such as an electrical motor) within industrial automation environment 300. The load side of each relay is coupled to a load, and the load side of each of the relays are coupled through their respective load. In this example, a first contact 330 of a first relay R1 321, and a second contract 331 of a third relay R3 323 are welded shut.

Figure 4:
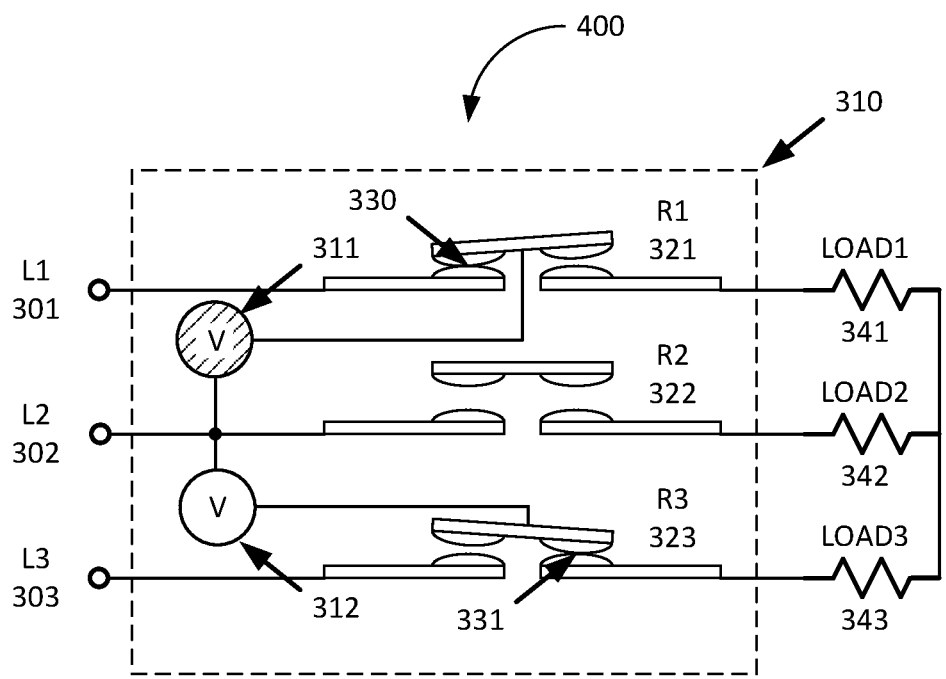

FIG. 4 illustrates the example relay system 310 of FIG. 3 within industrial automation environment 400 with power sources applied at least to inputs L1 301 and L2 301. In this example, since the first contact (input side) of the first relay R1 321 is welded shut, voltage sensor 311 measures a voltage between the spanner of the first relay R1 321 and the input side of the second relay R2 322 when the second relay R2 322 is open. Voltage sensor 312 does not measure any voltage between the spanner of the third relay R3 323 and the input side of the second relay R2 322 since the second relay R2 323 is open.

Here, the welded contact in the first relay R1 321 couples the spanner of the first relay R1 321 with the first power source coupled to input L1 301. Voltage sensor 311 then shows a voltage between the spanner of the first relay R1 321 and the input side of the second relay R2 322 essentially equal to the voltage difference between the power source coupled to input L1 301 and the power source coupled to input L2 302. In some examples, when the voltage measured by voltage sensor 311 exceeds a threshold, a weld is determined to be present in the first contact (input side) of the first relay R1 311. In other examples, when the voltage measured by voltage sensor 311 is substantially equal to the voltage difference between the power source coupled to input L1 301 and the power source coupled to input L2 302, a weld is determined to be present in the first contact (input side) of the first relay R1 311.

Figure 5:
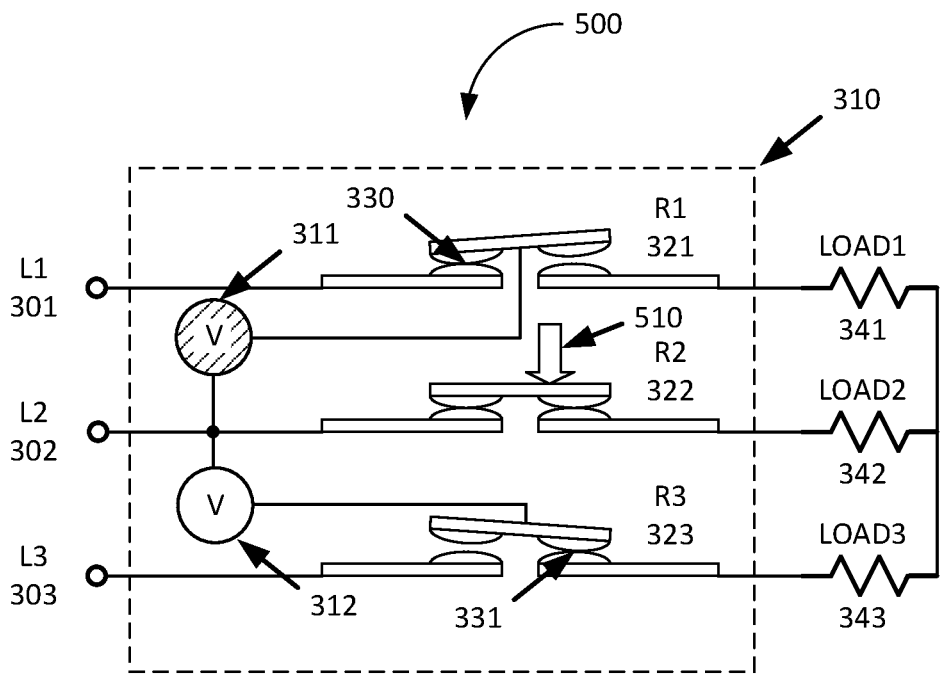

FIG. 5 illustrates the example relay system 310 of FIG. 4 within industrial automation environment 500 as a close signal 510 is applied to the second relay R2 322. In this example embodiment, a close signal 510 is applied to an input (typically the coil input) of the second relay R2 322 within relay system 310. This close signal 510 causes the second relay R2 322 to close.

Figure 6:
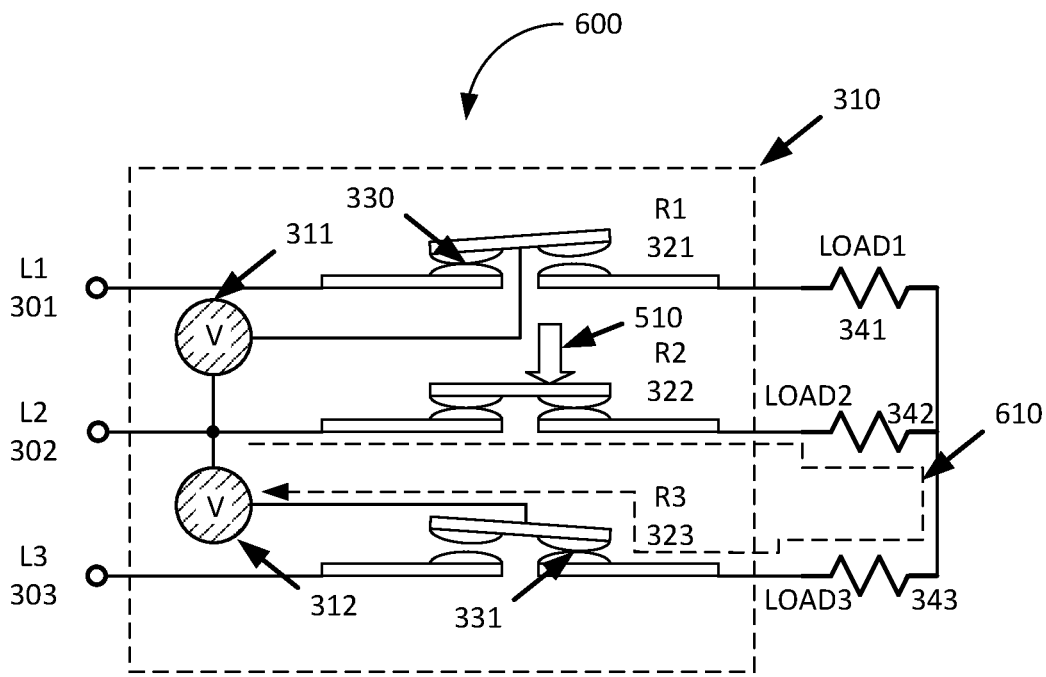

FIG. 6 illustrates the example relay system 310 of FIG. 5 within industrial automation environment 600 as the close signal 510 is applied to the second relay R2 322. Here, voltage sensor 312 measures a voltage drop across LOAD2 342 and LOAD3 343 through path 610. When the voltage detected by voltage sensor 312 exceeds a threshold, the controller determines that a weld exists on the second contact (load side) of the third relay R2 323.

In some example embodiments, the steps illustrated in FIGS. 3-6 are performed during system startup, and in some examples, these steps are performed a plurality of times to increase the probability of detecting any welds.

In response to detecting a weld, some example embodiments perform a system shutdown or disconnect the power source to prevent damage to the system and broadcast an alert message notifying users of the weld and the shutdown.

Figure 7:
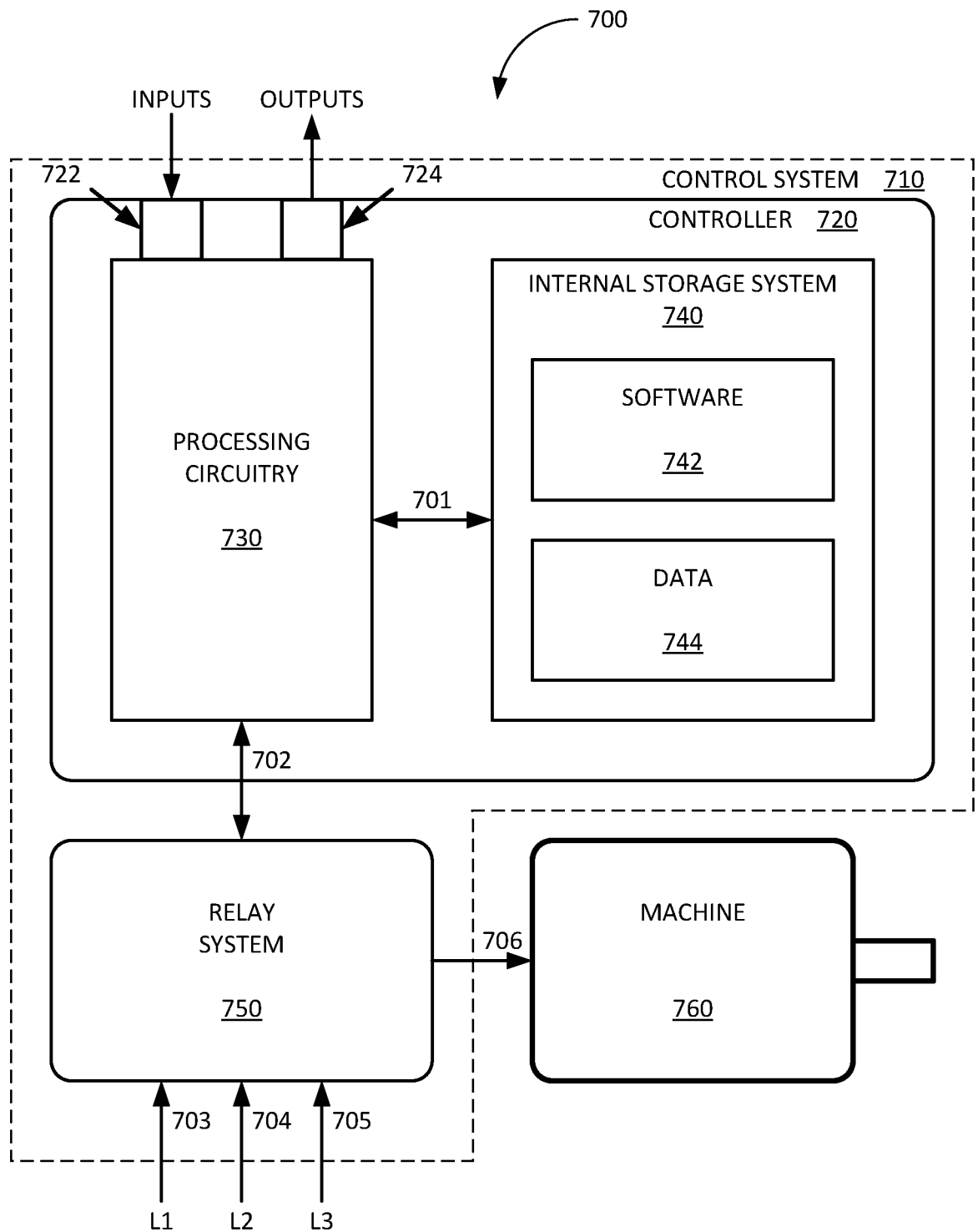
FIG. 7 illustrates an example block diagram of an industrial automation environment including a control system, configured to detect a welded relay contact, and an industrial machine.

FIG. 7 illustrates an example block diagram of an industrial automation environment 700 including a control system 710 configured to detect a welded relay contact, and an industrial machine 760. In this example embodiment, control system 710 includes controller 720 and relay system 750. Relay system 750 is similar to those illustrated in FIGS. 1-6 and described in detail above. In this example embodiment, relay system 750 receives three phases of power from a power source (not illustrated). Here, the three phases of power include L1 703, L2 704, and L3 705. Relay system 750 supplies power to machine 760 through link 706. In this example, link 706 includes at least three electrical conductors, each supplying a phase of power to machine 760. Relay system 750 receives commands from, and provides data to, controller 720 over link 702.

In this example embodiment, controller 720 includes processing circuitry 730, internal storage system 740, input port 722, and output port 724. Processing circuitry 730 is coupled with internal storage system 740 through link 701. Processing circuitry 730 is also coupled with relay system 750 through link 702.

Input port 722 is configured to receive control signals and data from external computing devices (not illustrated). Output port 724 is configured to provide control signals and data to external computing devices (not illustrated).

Processing circuitry 730 comprises electronic circuitry configured to direct control system 710 to control machine 760, and to detect a welded relay contact within relay system 750 by performing a weld detection check as described above. Processing circuitry 730 may comprise microprocessors and other circuitry that retrieves and executes software 742. Examples of processing circuitry 730 include general purpose central processing units, application specific processors, and logic devices, as well as any other type of processing device, combinations, or variations thereof. Processing circuitry 730 may be implemented within a single processing device but may also be distributed across multiple processing devices or sub-systems that cooperate in executing program instructions.

Internal storage system 740 may comprise any non-transitory computer readable storage media capable of storing software 742 that is executable by processing circuitry 730. Internal storage system 740 may also include various data structures 744 which comprise one or more registers, databases, tables, lists, or other data structures. Storage system 740 may include volatile and nonvolatile, removable and non-removable media implemented in any method or technology for storage of information, such as computer readable instructions, data structures, program circuits, or other data.

Storage system 740 may be implemented as a single storage device but may also be implemented across multiple storage devices or sub-systems co-located or distributed relative to each other. Storage system 740 may comprise additional elements, such as a controller, capable of communicating with processing circuitry 730. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which may be used to store the desired information and that may be accessed by an instruction execution system, as well as any combination or variation thereof.

Software 742 may be implemented in program instructions and among other functions may, when executed by controller 720 in general, or processing circuitry 730 in particular, direct controller 720, or processing circuitry 730, to operate as described herein to control machine 760, and to detect a welded relay contact within relay system 750 by performing a weld detection check. Software 742 may include additional processes, programs, or components, such as operating system software, database software, or application software. Software 742 may also comprise firmware or some other form of machine-readable processing instructions executable by elements of processing circuitry 730.

In general, software 742 may, when loaded into processing circuitry 730 and executed, transform processing circuitry 740 overall from a general-purpose computing system into a special-purpose computing system customized to operate as described herein for a controller 720 configured to control machine 760, and to detect a welded relay contact within relay system 750 by performing a weld detection check, among other operations. Encoding software 742 on internal storage system 740 may transform the physical structure of internal storage system 740. The specific transformation of the physical structure may depend on various factors in different implementations of this description. Examples of such factors may include, but are not limited to the technology used to implement the storage media of internal storage system 740 and whether the computer-storage media are characterized as primary or secondary storage.

For example, if the computer-storage media are implemented as semiconductor-based memory, software 742 may transform the physical state of the semiconductor memory when the program is encoded therein. For example, software 742 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Figure 8:
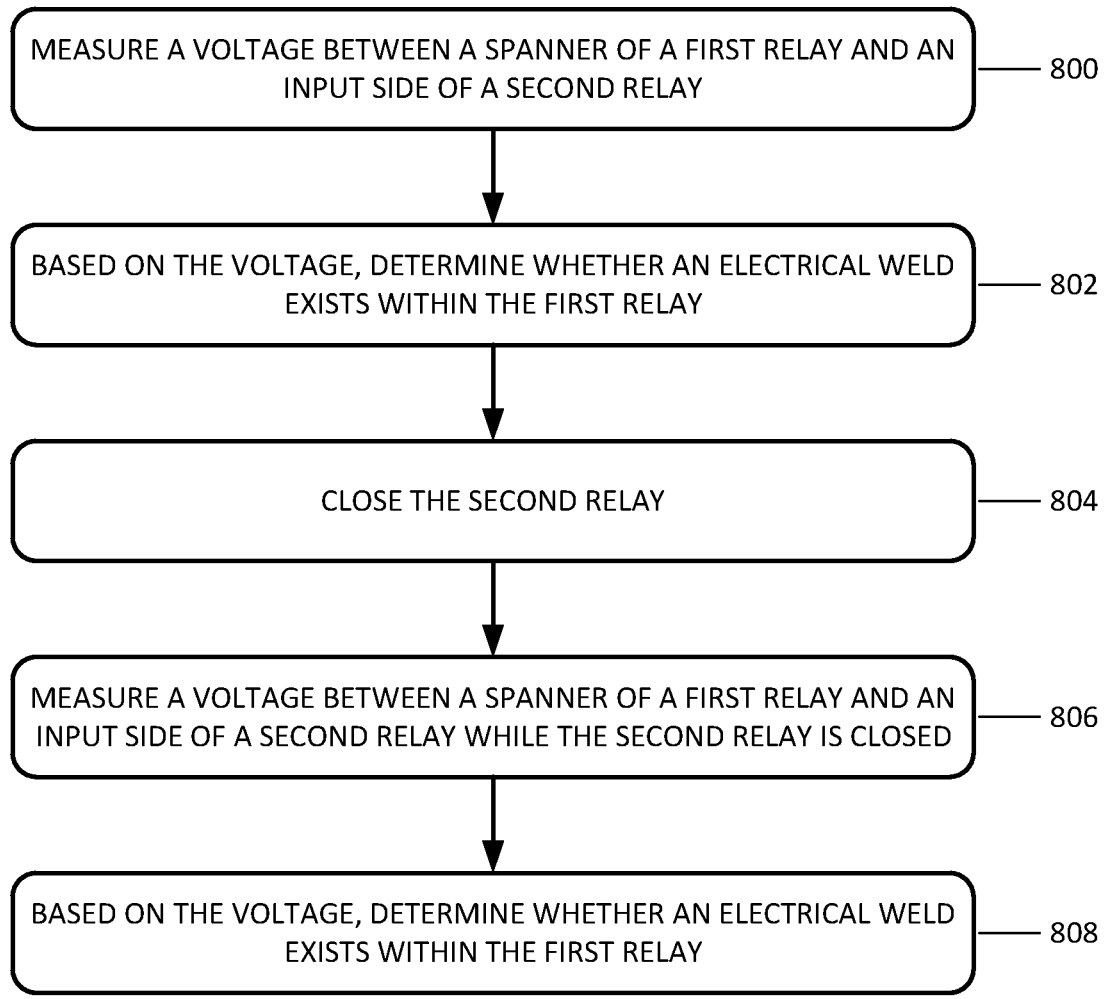
FIG. 8 illustrates a flowchart of an example method for detecting a welded relay contact by performing a weld detection check.

FIG. 8 illustrates a flowchart of an example method for detecting a welded relay contact by performing a weld detection check. In this example embodiment, controller 720 directs voltage sensor 311 to measuring a voltage between a spanner of a first relay of a plurality of relays and an input side of a second relay of the plurality of relays, (operation 800). Each relay of the plurality of relays includes a first contact on an input side of the respective relay coupled to a power source, a second contact on a load side of the respective relay coupled to a load, and a spanner configured to close the first and second contacts of the respective relay when activated by a close signal. The load sides of each of the respective relays are coupled through their respective loads.

Based on the voltage between the spanner of the first relay and the input side of the second relay, controller 720 determines whether an electrical weld of one of the first contact and the second contact of the first relay exists, (operation 802). In some examples, when the voltage between the spanner of the first relay and the input side of the second relay exceeds a threshold, controller 720 determines that a weld exists within the first relay.

Controller 720 transmits a close signal to the second relay, (operation 804), and the second relay closes. Controller 720 directs voltage sensor 311 to measuring a voltage between the spanner of the first relay and the input side of the second relay while the second relay is closed, (operation 806).

Based on the voltage between the spanner of the first relay and the input side of the second relay while the second relay is closed, controller 720 determines whether an electrical weld of one of the first contact and the second contact of the first relay exists, (operation 808). In some examples, when the voltage between the spanner of the first relay and the input side of the second relay exceeds a threshold, controller 720 determines that a weld exists within the first relay.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as relays, unless otherwise stated, are generally representative of any one or more elements configured to operate as a relay or switch. Such relay components include relays, contactors, and similar components.

Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same terminals. For example, a resistor or capacitor shown and described herein as a single component may instead be multiple resistors or capacitors, respectively, coupled in series between the same two terminals as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A system, comprising:
a relay system, comprising a plurality of relays, wherein each respective relay of the plurality of relays comprises a double-break relay and has a first contact on an input side of the respective relay, the input side coupled to a corresponding phase of a multi-phase power source that differs relative to each phase coupled to each other relay of the plurality of relays, a second contact on a load side of the respective relay coupled to a load, a spanner configured to close the first and second contacts of the respective relay when activated by a close signal, and wherein the load side of the respective relay is coupled to the load side of each other relay of the plurality of relays; and
a controller, comprising:
one or more processors; and
a memory having stored thereon instructions that, upon execution by the one or more processors, cause the one or more processors to perform a weld detection check;
wherein, to perform the weld detection check, the instructions direct the one or more processors to:
measure a voltage between a spanner of a first relay of the plurality of relays and an input side of a second relay of the plurality of relays, resulting in a measured voltage; and
based on the measured voltage, determine whether an electrical weld exists on the first contact of the first relay.

2. The system of claim 1, wherein, to determine whether the electrical weld exists on the first contact of the first relay, the instructions cause the one or more processors to:
when the voltage between the spanner of the first relay and the input side of the second relay exceeds a threshold, determine that the electrical weld exists on the first contact on the input side of the first relay.

3. The system of claim 1, wherein the first contact on the input side of the first relay is coupled with a first phase of the multi-phase power source and the first contact on the input side of the second relay is coupled with a second phase of the multi-phase power source, and wherein the instructions comprise further instructions that, upon execution by the one or more processors, cause the one or more processors to:
measure a voltage between the first contact on the input side of the first relay and the first contact of the input side of the second relay, resulting in a second measured voltage; and
when the measured voltage is substantially equal to the second measured voltage, determine that an electrical weld exists on the first contact on the input side of the first relay.

4. The system of claim 1, wherein the instructions comprise further instructions that, upon execution by the one or more processors, cause the one or more processors to:
transmit a close signal to a spanner of the second relay;
measure a voltage between the spanner of the first relay and the first contact on the input side of the second relay while the second relay is closed, resulting in the measured voltage; and
determine whether an electrical weld exists on the second contact on the load side of the first relay based on the measured voltage.

5. The system of claim 4, wherein the first contact on the input side of the first relay is coupled with a first phase of the multi-phase power source and the first contact on the input side of the second relay is coupled with a second phase of the multi-phase power source, and wherein the instructions comprise further instructions that, upon execution by the one or more processors, cause the one or more processors to:
when the measured voltage between the spanner of the first relay and the first contact on the input side of the second relay exceeds a threshold, determine that an electrical weld exists on the second contact on the load side of the first relay.

6. The system of claim 1, wherein the instructions direct the one or more processors to perform the weld detection check sequentially on two or more relays in the plurality of relays.

7. The system of claim 1, wherein the instructions direct the one or more processors to perform the weld detection check one or more times on startup of the system.

8. The system of claim 1, wherein the instructions comprise further instructions that, upon execution by the one or more processors, cause the one or more processors, in response to detecting the electrical weld to complete one or more of the following:
perform a system shutdown;
disconnect the multi-phase power source to shut down the system;
broadcast an alert message.

9. The system of claim 1, wherein the instructions cause the one or more processors to perform a weld detection check using electrical pulses.

10. The system of claim 1, wherein the system is an industrial automation motor starter and one or more loads, comprising the load side of the respective relay and the load side of each other relay of the plurality of relays, are electrical motors.

11. A method for detecting a welded relay contact, the method comprising:
performing a weld detection check, comprising:
measuring a voltage between a spanner of a first relay of a plurality of relays and an input side of a second relay of the plurality of relays, resulting in a measured voltage, wherein each relay of the plurality of relays comprises a first contact on an input side of the respective relay coupled to a corresponding phase of a multi-phase power source that differs relative to each phase coupled to each other relay of the plurality of relays, a second contact on a load side of the respective relay coupled to a load, a spanner configured to close the first and second contacts of the respective relay when activated by a close signal, and wherein the load side of the respective relay is coupled to a load side of each other relay of the plurality of relays; and
based on the measured voltage, determining whether an electrical weld of the first contact of the first relay exists.

12. The method of claim 11, further comprising:
when the measured voltage exceeds a threshold, determining that an electrical weld exists on the first contact of the first relay.

13. The method of claim 11, wherein an input side of the first relay is coupled with a first power source and the input side of the second relay is coupled with a second power source, the method further comprising:
measuring a voltage between the first power source and the second power source, resulting in a second measured voltage; and
when the measured voltage is substantially equal to the second measured voltage, determining that an electrical weld exists on the first contact of the first relay.

14. The method of claim 11, further comprising:
transmitting a close signal to a spanner of the second relay;
measuring a voltage between the spanner of the first relay and the input side of the second relay while the second relay is closed, resulting in the measured voltage; and
based on the measured voltage, determining whether an electrical weld exists on the second contact of the first relay.

15. The method of claim 14, wherein an input side of the first relay is coupled with a first power source and the input side of the second relay is coupled with a second power source, the method further comprising:
when the measured voltage exceeds a threshold, determining that an electrical weld exists on the second contact of the first relay.

16. The method of claim 11, further comprising:
performing the weld detection check on two or more relays of the plurality of relays sequentially.

17. The method of claim 11, further comprising:
performing the weld detection check in response to startup of a system comprising the plurality of relays.

18. The method of claim 11, further comprising:
in response to detecting the electrical weld, automatically disconnecting the multi-phase power source to shut down a system comprising the plurality of relays.

19. The method of claim 11, wherein the plurality of relays are incorporated in an industrial automation motor starter and one or more loads, comprising the load side of the respective relay and the load side of each other relay of the plurality of relays, are electrical motors.

20. A system, comprising:
a relay system, comprising a plurality of relays, wherein each respective relay of the plurality of relays comprises a double-break relay and has a first contact on an input side of the respective relay, the input side coupled to a power source, a second contact on a load side of the respective relay coupled to a load, and a spanner configured to close the first and second contacts of the respective relay when activated by a close signal, and wherein the respective relay is coupled to a load side of each other relay of the plurality of relays through the load sides of the respective relay; and
a controller, comprising:
one or more processors; and
a memory having stored thereon instructions that, upon execution by the one or more processors, cause the one or more processors to perform a weld detection check;

wherein, to perform the weld detection check, the instructions direct the one or more processors to:
measure a voltage between a spanner of a first relay of the plurality of relays and an input side of a second relay of the plurality of relays, resulting in a measured voltage; and
based on the measured voltage, determine whether an electrical weld of the first contact of the first relay exists.

* * * * *